Patented June 11, 1940

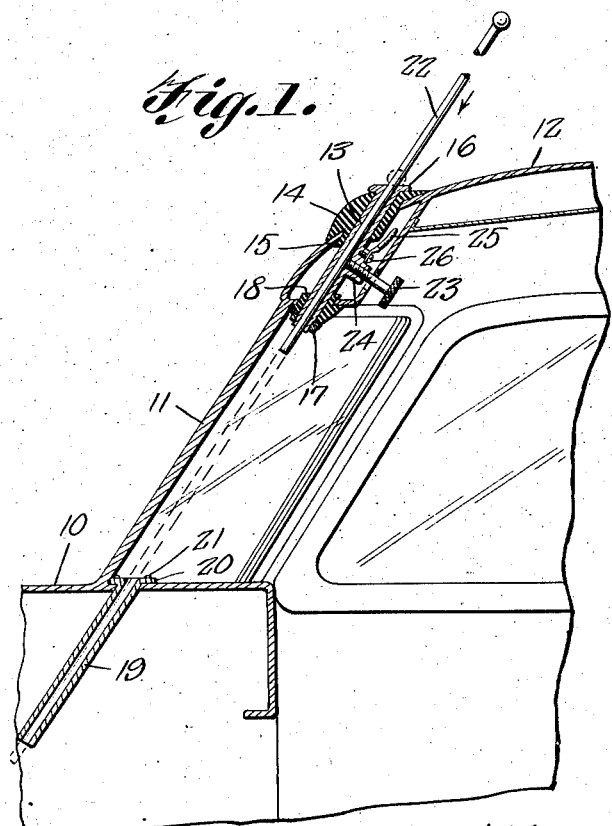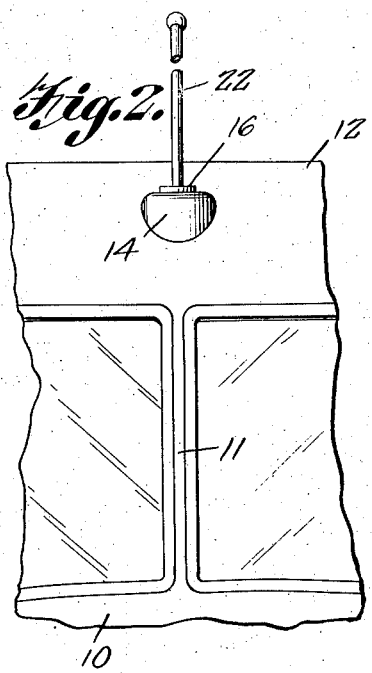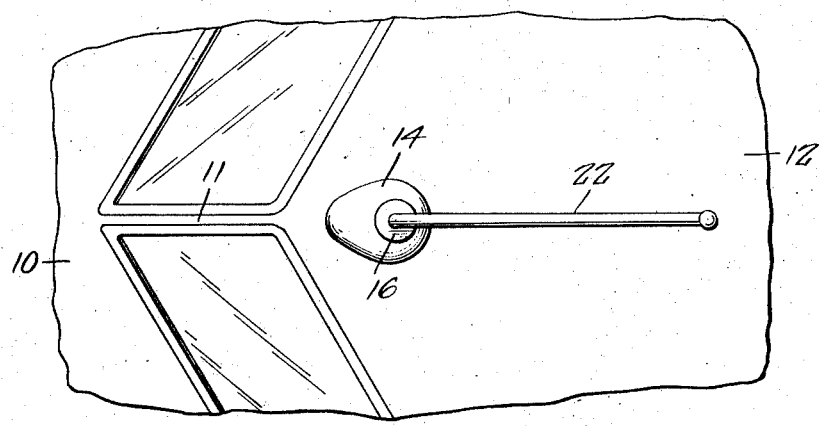

2,204,031

UNITED STATES PATENT OFFICE 2,204,031

AUTOMOBILE RADIO MAST

Sven Stevenson, Buffalo, N. Y.

Application April 10, 1939, Serial No. 267,073

1 Claim. (Cl. 250—33)

This invention relates to automobile radio masts and has for an object to provide a mast including a tubular section fixed in the instrument panel and extending into the cowl, and a reception mast within this tubular section operable from within the automobile to extend above the top of the automobile for use or projection below the section fixed in the instrument board so as to be concealed when not in use.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a sectional view of the front of an automobile equipped with a radio mast constructed in accordance with the invention.

Figure 2 is a front elevation of the parts shown in Figure 1.

Figure 3 is a top plan view of the parts shown in Figure 1.

Referring now to the drawing in which like characters of reference designate similar parts in the various views, 10 designates the cowl, 11 the center rod of the windshield, and 12 the front of the top of a conventional automobile.

In carrying out the invention I provide a tubular member 13 which is passed through a rubber insulating plug 14 which closes an opening 15 in the front of the top 12. A shoulder 16 on one end of the member, and a nut 17 threaded on the other end of the member, holds the member in place. The lower end of the member is passed through a rubber plug 18 which insulates it from the metal top, as best shown in Figure 1.

A tubular member 19 is provided with a shoulder 20 at the top which is secured by screws 21 or other connectors to the top of the cowl inside the windshield at the bottom of the center rod 11 of the windshield. The member extends downwardly from the cowl in axial alignment with the upper member 13.

A radio reception mast 22 is slidably fitted in the upper member 13 and the lower member 19 so as to be concealed within the vehicle when not in use. The mast may be slid upwardly to project above the top of the vehicle for use. A set screw 23 is passed through a lug 24 that is formed integral with the upper member 13 and bears against the mast to hold the mast in position for reception. A lead-in wire 25 is connected to the lug 24 by a screw 26 or other connector.

From the above description it will be seen that the radio mast disappears when not in use, that it is controlled from the inside of the vehicle and that an antenna of predetermined length can be used while at the same time the appearance of the vehicle is greatly promoted.

What is claimed is:

The combination with the wind shield, the cowl below the wind shield and the roof of a motor vehicle, of a tubular member secured in upright position to the roof of the motor vehicle at about the median line of the wind shield, an insulating bushing sleeved on the tubular member at the roof, a guide tube secured at the top to and extending downwardly from the cowl, a radio mast slideably fitted in the tubular member and adapted to be moved downwardly through the tubular member and engaged in said guide tube when retracted within the vehicle, said mast being adapted to be withdrawn from the guide tube and slid upwardly through the tubular member to extend above the roof of the vehicle, and a set screw carried by the tubular member and engaging the mast for holding the mast in retracted position within the vehicle or in extended position above the vehicle.

SVEN STEVENSON.